J. W. BLISS.
Door Plate.
No. 1,066. Reissued Oct. 16, 1860.
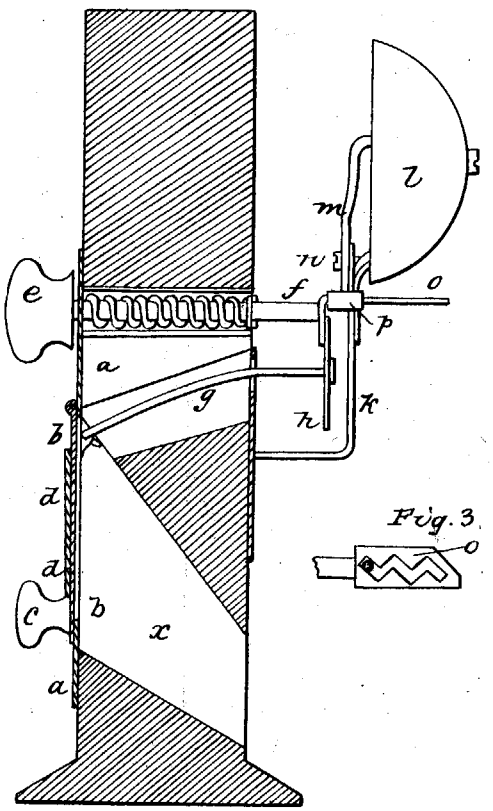
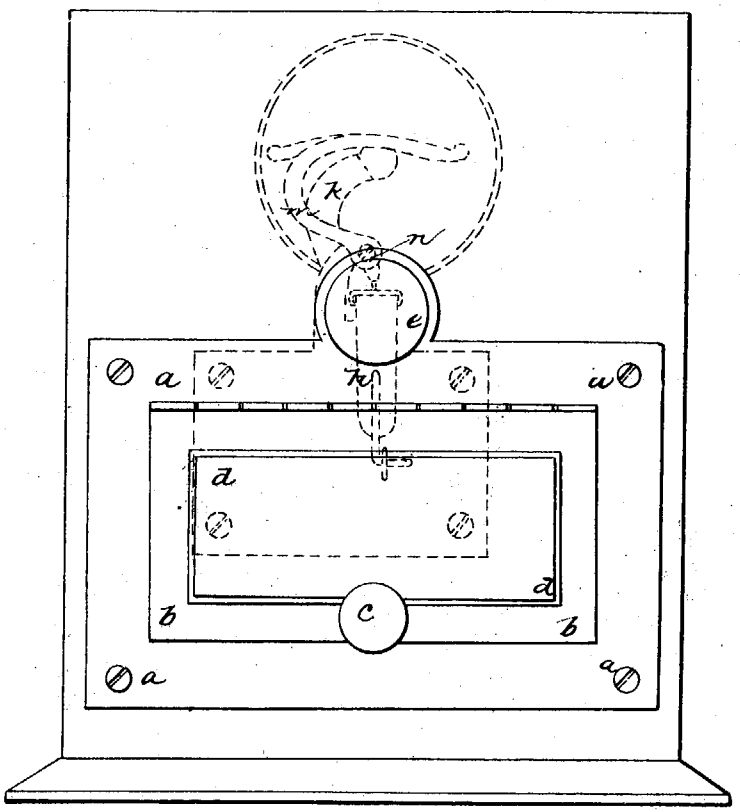
N. PETERS, Photo-Lithographer, Washington, D. C.

UNITED STATES PATENT OFFICE.

JEREMY W. BLISS, OF HARTFORD, CONNECTICUT.

IMPROVEMENT IN DOOR-PLATES.

Specification forming part of Letters Patent No. 20,859, dated July 13, 1858; Reissue No. 1,066, dated October 16, 1860.

*To all whom it may concern:*

Be it known that I, JEREMY W. BLISS, of the city and county of Hartford, and State of Connecticut, have invented certain new and useful Improvements in Door-Plates and Accessories Thereto; and I do hereby declare that the following description, taken in connection with the drawings, is a full, clear, and exact description thereof.

In the drawings, Figure 1 is an elevation of a portion of a street or front door with my improved plate and accessories attached thereto, the parts which would be hid by the door being represented in red lines. Fig. 2 is a vertical section through the same, showing the bell-pull, spring, and bell and its mountings in elevation. Fig. 3 is a plan of a slotted plate which changes the direction of the motion communicated to the bell-pull and causes it to be imparted to the hammer.

There are two principal objects which my invention secures: First, the utilization of the name-plate by causing it, in addition to its ordinary duty, to perform the further office of a cover to a slot in the door; second, the simplification and cheapening of the bell-pull and bell as a whole, and as accessories to these the construction of the whole contrivance in such manner that it may be used by different tenants of the same house who may happen to occupy it in succession without putting each to any considerable expense for alterations.

The contrivance taken as a whole consists of a frame, *a a*, properly secured to the outside of the door, to which, by a proper hinge at the top, is attached a plate, *b b*, the latter having secured to it a small knob, *c*, or any equivalent thereof, by means of which the hinged plate can be fitted. Upon the front of this plate is secured, by screws or bolts, or in any other way which affords facility of detachment, another plate, *d d*, and upon this latter the name of the occupant of the house, and the number of the house, also, if desirable, is to be engraved.

The upper part of the frame is to be so formed as to constitute an escutcheon for a bell-pull, *e*, and from this bell-pull a spindle, *f*, leads through a hole pierced in the door. This spindle is encompassed by a spiral spring, one end of which bears against the escutcheon and the other against a pin in the spindle, the office of this spring being to retract the bell-pull and cause it to apply itself to the escutcheon. Directly behind the name-plate a slit, *x*, is cut through the door, and the plate serves as a cover to this slit. A small rod, *g*, is attached to an eye in the back of the name-plate, passes through the door and through a small pendant, *h*, which is attached to the spindle before referred to. This rod has a nut or head on the rear of the pendant, and slides freely through the pendant, so that the latter may be moved toward the outside of the door without disturbing the rod or the name-plate. On the back of the door, by means of a standard, such as *k*, is secured a small bell or gong, *l*. This bell is provided with a hammer, *m*, pivoted at *n*, and the tail of this hammer enters a zigzag slot, *z*, (see Fig. 3,) in a sliding plate, *o*, which is attached to the spindle of the bell-pull and slides in a guide-box, *p*, which is supported by the standard.

As before stated, the name of the occupant is to be engraved or otherwise depicted on the removable plate, and when the tenant removes and a new one takes his place the latter has only to incur the small expense of removing this plate and replacing it by a new one. When papers or letters are to be left, the carrier has only to lift the hinged plate and drop them in, and the act of lifting will cause the rod to actuate the zigzag plate and ring the bell, informing the residents or their servants that something has been deposited. When a visitor desires to see any person within, he pulls the bell-knob as usual, and the pull will, through the plate *o*, operate the bell-hammer and ring the bell, and in consequence of the peculiar attachment of the rod *g* to the pendant this pull will not vibrate the name-plate, which serves as a weather-protector to the slit in the door. My arrangement of the bell-pull on the face of the door and in the immediate neighborhood of the name-plate is a very a convenient one, as it catches the eye at the same moment that the latter reads the name, while at the same time, in consequence of its in part making parts of the door-plate, it is not an obtrusive feature and does not strike the eye as an unusual or extraordinary accessory of a door. The combined arrangement of the bell-pull on the outside of the door and the bell and hammer on the inside thereof is a very simple and inexpensive one, very little liable to get out of order, and when desired is easy to repair, there being no long wires, bell-cranks, chains, or any parts concealed in floors or hidden behind plastering.

Now, I wish it to be distinctly understood that parts of my invention may be used separately from the others, but I believe that the best results will be obtained when all are used together; and I also desire to be understood that the special mechanism for actuating the bell-hammer forms no part of my invention, and that any proper connection between the hinged plate or the bell-pull and the hammer may be substituted for those specially described without changing the principles of my invention.

I claim as of my own invention—

1. A frame or perforated plate attached to a door in combination with a hinged plate upon which the name of the occupant of the house is depicted, and with a slot or aperture through the door, to which the name-plate serves as a cover, the combination being substantially such as is specified, and this combination I also claim when the hinged name-plate is combined with an alarm-bell, which is struck when the plate is lifted.

2. A hinged door plate and a bell-pull on the outside of a door, in combination with a single bell and a single striking mechanism attached to the inside of the same door, when the whole are arranged and combined substantially in the manner specified.

In testimony whereof I have hereunto subscribed my name, in the city of Hartford, on this 12th day of November, 1859.

JEREMY W. BLISS.

In presence of—

A. SHELDON,

GOODWIN COLLIER.